United States Patent
Clift et al.

(10) Patent No.: US 8,856,944 B2
(45) Date of Patent: Oct. 7, 2014

(54) OBSCURING SENSITIVE PORTIONS OF UNIVERSAL RESOURCE LOCATOR

(71) Applicant: Sony Corporation, Tokyo (JP)

(72) Inventors: Graham Clift, Poway, CA (US); Brant Candelore, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/624,692

(22) Filed: Sep. 21, 2012

(65) Prior Publication Data

US 2014/0090073 A1    Mar. 27, 2014

(51) Int. Cl.
G06F 7/04 (2006.01)
G06F 21/62 (2013.01)
G06F 21/12 (2013.01)

(52) U.S. Cl.
CPC ........ *G06F 21/6263* (2013.01); *G06F 21/6254* (2013.01); *G06F 21/128* (2013.01)
USPC .......................................................... 726/26

(58) Field of Classification Search
CPC   G06F 21/6263; G06F 21/6254; G06F 21/128
USPC ................... 726/22, 26; 709/228; 714/799
See application file for complete search history.

(56) References Cited

U.S. PATENT DOCUMENTS

| | | | | |
|---|---|---|---|---|
| 8,453,041 | B2 * | 5/2013 | Henderson et al. | 714/799 |
| 2004/0199762 | A1 * | 10/2004 | Carlson et al. | 713/153 |
| 2007/0245027 | A1 * | 10/2007 | Ghosh et al. | 709/228 |
| 2012/0124372 | A1 | 5/2012 | Dilley et al. | |
| 2012/0167227 | A1 * | 6/2012 | Henderson et al. | 726/26 |

OTHER PUBLICATIONS

Geoff Kuenning University of California, Santa Cruzm, "Anonymization Techniques for URLs and Filenames Technical Report UCSC-CRL-03-05" University of California, Santa Cruz, CA, Sep. 2003.*
Http://www.pc-help.org/obscure.htm; How to Obscure Any Url, Jan. 2002.*
Charles Song, Information-Hiding URLs for Easier Website Evolution, Sep. 2006.*
Sai Teja Peddinti, Nitesh Saxena, "On the Privacy of Web Search Based on Query Obfuscation: A Case Study of TrackMeNot", Published Jul. 21-23, 2010, http://link.springer.com/chapter/10.1007%2F978-3-642-14527-8_2?Ll=true.

* cited by examiner

*Primary Examiner* — Samson Lemma
(74) *Attorney, Agent, or Firm* — John L. Rogitz

(57) ABSTRACT

Portions of a URL such as the query string are obscured or otherwise removed from view in the address bar of a browser or other application automatically by the receiving device employing obscuration rules, or upon command from an originating device sourcing the resource.

17 Claims, 4 Drawing Sheets receiver logic (1)

receiver logic (2)

OBSCURING SENSITIVE PORTIONS OF UNIVERSAL RESOURCE LOCATOR

FIELD OF THE INVENTION

Present principles apply to obscuring sensitive portions of URLs.

BACKGROUND OF THE INVENTION

Uniform resource locators (URL), used herein to also denote uniform resource indicators (URI) in general, are character strings that reference network sources of content and in particular that reference Internet sources. A URL typically includes a scheme name referring to the protocol attending the resource, e.g., "http" for "hypertext transfer protocol" or "https" for "hypertext transfer protocol (secure)". The scheme name is usually followed by a colon and a double slash, then a server name, such as "www" for "world wide web" or "smtp" for "simple mail transfer protocol". A dot follows the server name and then a domain name or Internet Protocol (IP) address follows the dot. Thus, for example, a domain name following a server name might be "www.sony.com".

As understood herein, additional characters may follow the domain name. For example, a port number at which the resource is to be accessed may be included, and in the absence of a designated port, for http requests the default port number of 443 is used. For schemes that require authentication a username and password may also be included in the URL string. Moreover, a query string can be included in the URL containing data to be passed to the resource, and this query string can contain names of people. A query string may actually be generated by a client-side query and then appended to the URL. Still further, a fragment identifier may be included in a URL which indicates a position within the overall resource or document. When used with http, a fragment identifier can specify a section or location within the page, and the browser may scroll to display that part of the page.

As understood by present principles, URLs typically are stored in a history file for easy re-access, and as further understood herein, URLs from one device, such as an IPTV, may be copied into another device, such as a personal computer. Present principles recognize that portions of the URL, such as the query string, may contain sensitive information that a person may not wish to be presented in the address bar of a browser, and that other URLs may be intended to be accessed only by certain types of devices, e.g., TVs, and not by other device types, e.g., PCs.

SUMMARY OF THE INVENTION

An apparatus includes a processor, a display controlled by the processor, and a computer readable storage medium accessible to the processor and bearing instructions which when executed by the processor cause the processor to execute logic which includes receiving a uniform resource locator (URL) bearing a character string including at least one substring of characters for presentation of the character string on the display. The URL identifies a resource. The logic also includes obscuring at least the substring of characters from presentation on the display.

In non-limiting example embodiments, the substring of characters can be a query string, a person's name, a user name and/or password, or a fragment ID. The processor can obscure the substring of characters based on at least one rule applied by the processor to the substring, or responsive to a command from the resource (which may be embedded in the URL) to obscure at least a portion of the string of characters. The substring of characters can be obscured by replacing the characters with symbols, and/or by overwriting the characters with symbols, and/or by replacing the characters with blank spaces. Note that "replacing the characters with blank spaces" includes superimposing a blank character over an original character to make the original character look like it is blank, as well as deleting an original character.

In another aspect, a method includes determining whether a substring of characters in a uniform resource listing (URL) should be obscured from presentation on a display, and responsive to a determination that the substrings of characters should be obscured on the display, obscuring the substring of characters from view on the display and not obscuring portions of the URL that are not in the substring of characters.

In another aspect, a device includes a processor, a display controlled by the processor, and a computer readable storage medium accessible to the processor and bearing instructions which when executed by the processor to cause the processor to obscure portions of a uniform resource locator (URL) in an address bar of a browser or other application automatically by employing obscuration rules, and/or upon command from an originating device sourcing a resource associated with the URL.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
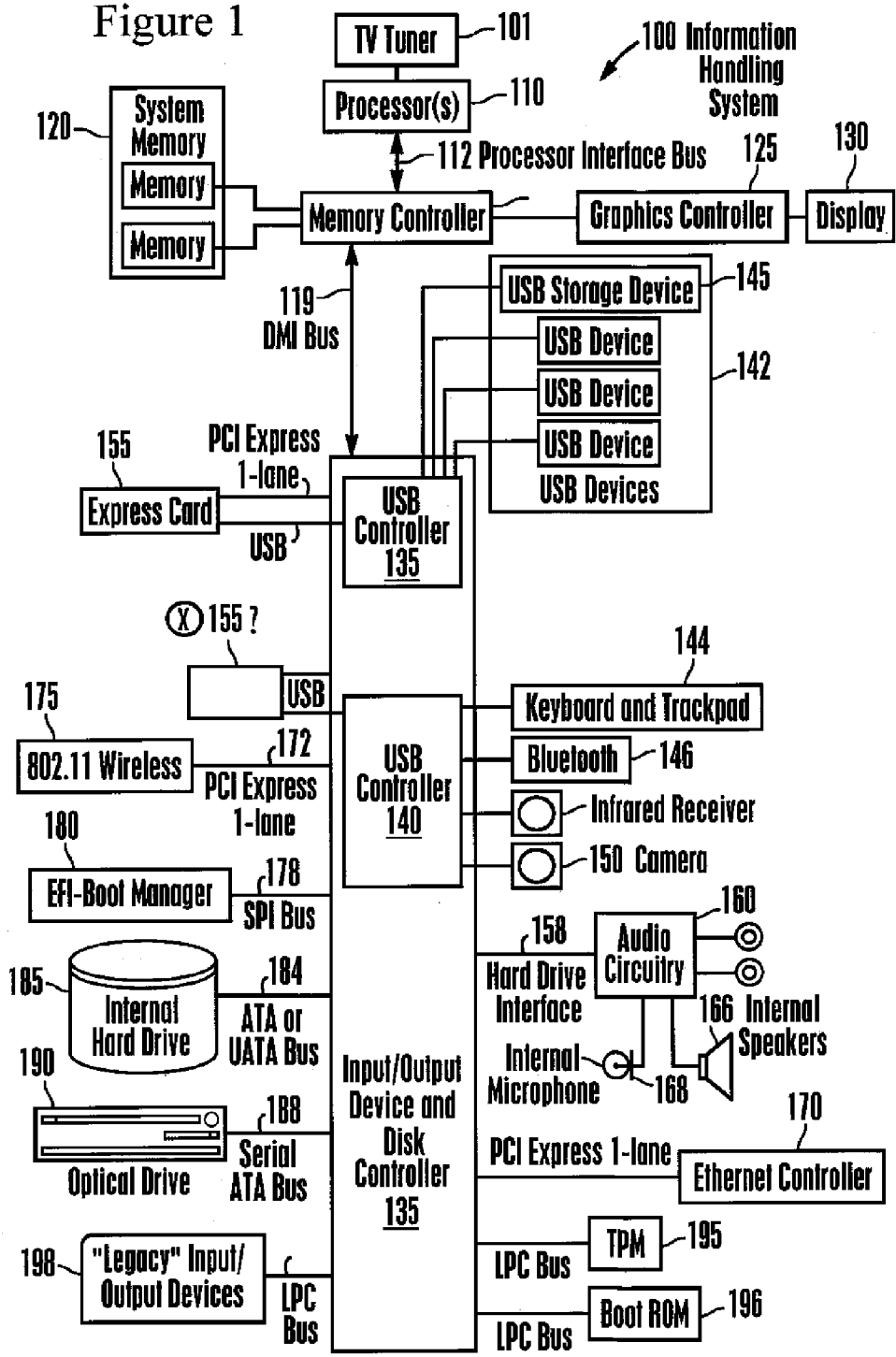
FIG. 1 is a block diagram of a data processing system in which the methods described herein can be implemented.
Figure 2:
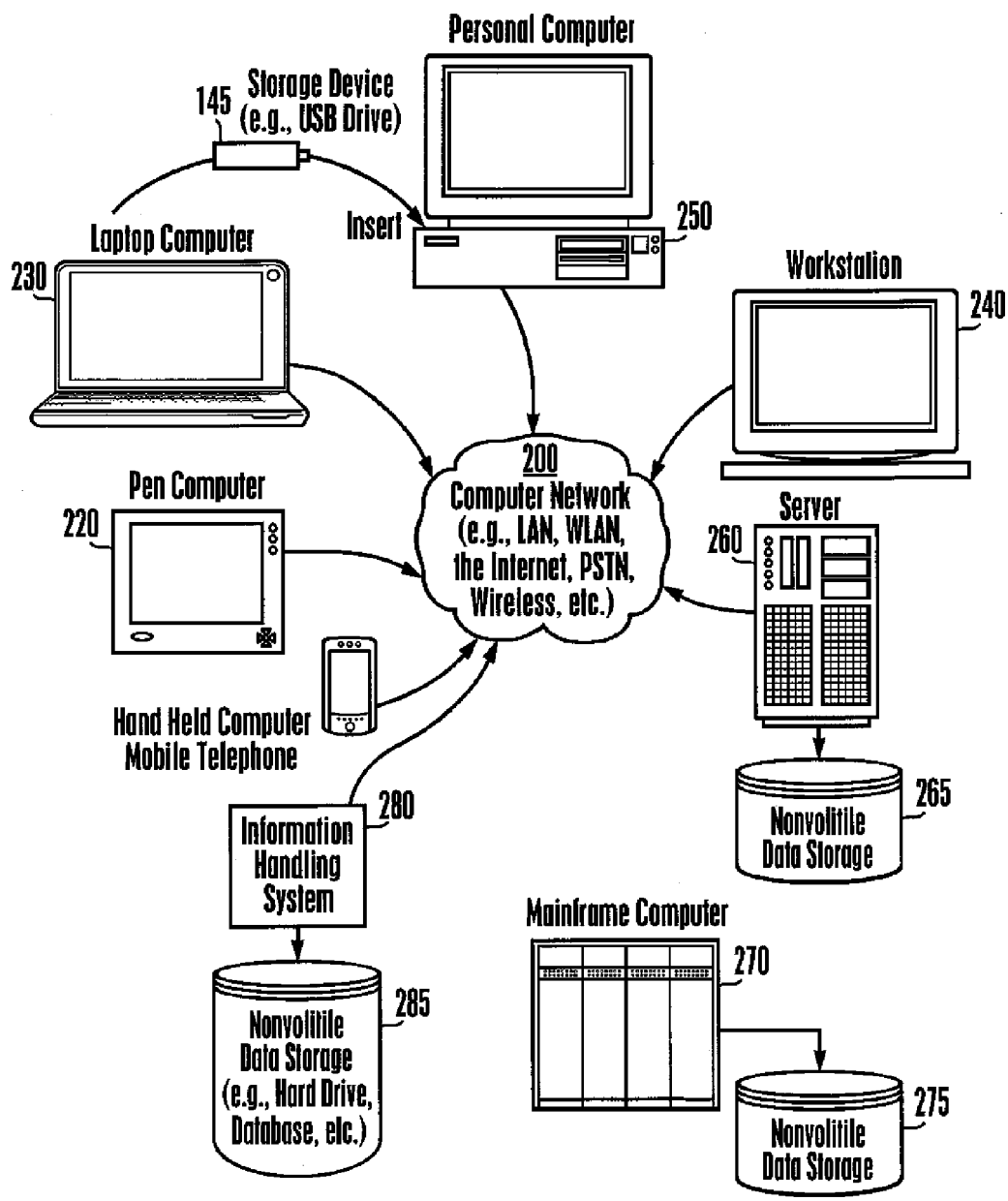
FIG. 2 illustrates an extension of the information handling system environment shown in FIG. 1 to illustrate that the methods described herein can be performed on a wide variety of information handling systems which operate in a networked environment.

Referring initially to FIG. 1, a computing environment is shown that is suitable to implement the software and/or hardware techniques associated with present principles. A networked environment is illustrated in FIG. 2 as an extension of the basic computing environment, to emphasize that modern computing techniques can be performed across multiple discrete devices. Note that while flow charts are used to conveniently describe logic executed by the computing environment, logic may be implemented as state logic or other logic forms.

FIG. 1 illustrates an example non-limiting information handling system 100, which is a simplified example of a computer system capable of performing computing operations described herein. In one embodiment, the information handling system 100 may be implemented as a TV, a set top box, or a combination thereof, such that the TV is an Internet Protocol TV. However, the system 100 may be implemented by other components, such as a game console, personal digital assistant, slate or tablet computer, personal computer, and so on. Note that the details of the system 100 shown in FIG. 1 are exemplary and not all components shown in FIG. 1 necessarily are embodied in every system 100 that can implement present principles. In an example embodiment, the system 100 is implemented by an IPTV executing hypertext transfer protocol (http) or more preferably in a pay TV system https as an internal communication protocol as well as a protocol to communicate with external devices.

As shown, the information handling system 100 includes one or more processors 110 coupled to a processor interface bus 112. The processor interface bus 112 can connect the processors 110 to a Memory Controller Hub (MCH) 115. In turn, the MCH 115 can be connected to a system memory 120 and can provide an avenue for the processor(s) 110 to access the system memory. A graphics controller 125 may also be connected to the MCH 115. In one embodiment, a peripheral component interface (PCI) Express bus 118 can connect the MCH 115 to a graphics controller 125, which controls a display device 130, such as a standard definition or high definition TV display.

The MCH 115 and an input/output (I/O) Controller Hub (ICH) 135 can connect to each other using an interface bus 119. In one embodiment, the interface bus 119 may be a Direct Media Interface (DMI) bus that transfers data at high speeds in each direction between the MCH 115 and ICH 135. In another embodiment, a PCI bus may connect the MCH to the ICH. Note that the ICH 135 can be embodied as a chip that generally implements capabilities that operate at slower speeds than the capabilities provided by the MCH. The ICH 135 typically provides various busses used to connect various components. These busses can include, for example, PCI and PCI Express busses, an industry standard architecture (ISA) bus, a system management bus (SMBus or SMB), and/or a low pin count (LPC) bus. The LPC bus often connects low-bandwidth devices, such as a boot ROM 196 and "legacy" I/O devices 198 (using a "super 110" chip). The "legacy" I/O devices 198 can include, for example, serial and parallel ports, keyboard, mouse, and/or a floppy disk controller. In the example shown, the LPC bus also connects the ICH 135 to a trusted platform module (TPM) 195. Other components often included in the ICH 135 include a direct memory access (DMA) controller, a programmable interrupt controller (PIC), and a storage device controller, which connects the ICH 135 to a nonvolatile storage device 185, such as a hard disk drive or optical drive or the like, using a bus 184.

An ExpressCard 155 can be instantiated as a slot that connects hot-pluggable devices to the information handling system. The ExpressCard 155 supports both PCI Express and Universal Serial Bus (USB) connectivity as it connects to the ICH 135 using both the USB the PCI Express bus. Also, the ICH 135 can include a USB controller 140 that provides USB connectivity to devices that connect to the USB. These devices may include, without limitation, a webcam (camera) 150, an infrared (IR) receiver 148, a keyboard and trackpad 144, and a Bluetooth device 146, which provides for wireless personal area networks (PANs). The USB Controller 140 also provides USB connectivity to other miscellaneous USB connected devices 142, such as a mouse, removable nonvolatile storage device 145, modems, network cards, integrated services digital network (ISDN) connectors, fax, printers, USB hubs, and many other types of USB connected devices. While the removable nonvolatile storage device 145 is shown as a USB-connected device, it is to be understood that the removable nonvolatile storage device 145 can be connected using a different interface, such as a Firewire interface, etc.

Additionally, a wireless local area network (LAN) device 175 can be connected to the ICH 135 via the PCI or PCI Express bus 172. The LAN device 175 typically implements one of the Institute of Electrical and Electronics Engineers (IEEE) 802.11 standards of over-the-air modulation techniques that all use the same protocol to wireless communicate between the information handling system 100 and another computer system or device. An optical storage device 190 can be connected to the ICH 135 using a Serial advanced technology attachment (SATA) bus 188. Serial ATA adapters and devices communicate over a high-speed serial link. The SATA bus 188 may also connect to the ICH 135 to other forms of storage devices, such as hard disk drives. Audio circuitry 160, such as a sound card, connects to the ICH 135 via bus the 158. The audio circuitry 160 also provides functionality such as audio line-in and optical digital audio in port 162, optical digital output and headphone jack 164, internal speakers 166, and an internal microphone 168. An ethernet controller 170 may also be connected to the ICH 135 using a bus, such as the PCI or PCI Express bus. The ethernet controller 170 connects the information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, automatic teller machine (ATM), a portable telephone device, a communication device or other devices that include a processor and memory such as TVs. When the system 100 is embodied as a TV or STB, a TV tuner 101 may be provided and controlled by the processor.

Turning to FIG. 2, an extension of the information handling system environment shown in FIG. 1 illustrates that the methods described herein can be performed on a wide variety of information handling systems that operate in a networked environment. Types of information handling systems range from small handheld devices, such as a handheld computer/mobile telephone 210 to large mainframe systems, such as a mainframe computer 270. Examples of handheld computers 210 include personal digital assistants (PDAs), personal entertainment devices, such as MP3 players, portable televisions, and compact disc players. Other examples of information handling systems include a pen, or tablet, computer 220, a laptop, or notebook, computer 230, a workstation 240, a personal computer system 250, and a server 260. Other types of information handling systems that are not individually shown in FIG. 2 are represented by an information handling system 280.

As shown, the various information handling systems can be networked together using a computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depict separate nonvolatile data stores (for example, the server 260 uses a nonvolatile data store 265, the mainframe computer 270 uses a nonvolatile data store 275, and the information handling system 280 uses a nonvolatile data store 285). The nonvolatile data store can be a component that is external to the various information handling systems or can be internal to one of the information handling systems. In addition, a removable nonvolatile storage device 145 can be shared among two or more information handling systems using various techniques, such as connecting the removable nonvolatile storage device 145 to a USB port or other connector of the information handling systems.

Figure 3:
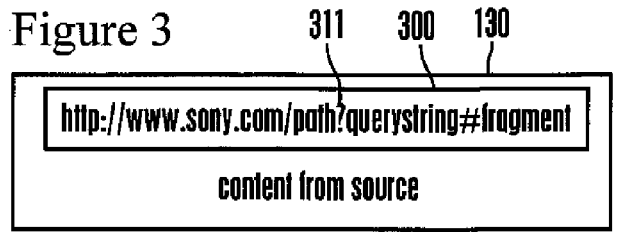
FIG. 3 is a screen shot showing an example URL string when no obscure decision or command is present.

With the above non-limiting example general architectures of individual computing devices and computing networks, attention is now drawn to FIG. 3, in which an Internet address bar 300 is presented on the display 130 to present a URL. As shown, the example URL shown includes a scheme name 302 referring to the protocol attending the resource, a server name 304, and then a domain name 306. A path name 308 follows the domain name 306 and following the path name 308, a query string 310. Note that the query string 310 may follow an initial delimiter character such as a question mark 311. A fragment ID 312 may follow the query string 310, or the query string may simply end. The end of the query string may be indicated by a terminal delimiter such as a pound sign or no terminal delimiter may be provided, it being inferred that the end of the URL is the end of the query string.

Figure 4:
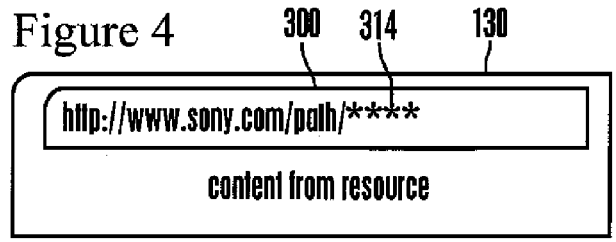
FIG. 4 is a screen shot showing the example URL string in FIG. 3 when an obscure decision or command is present, in which a substring of characters is obscured by replacing them or overlaying them with a character such as an asterisk.
Figure 5:
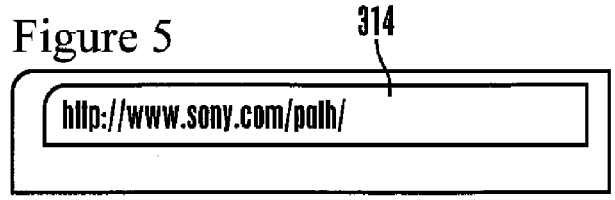
FIG. 5 is a screen shot showing the example URL string in FIG. 3 when an obscure decision or command is present, in which a substring of characters is obscured by presenting blank space in their place.

In FIG. 4, responsive to a determination that a substring of characters is to be obscured from the URL shown in FIG. 3, characters, in this case, asterisks 314, appear in place of a substring of characters, in this case, in place of the query string 310 and fragment ID 312 shown in FIG. 3. Or, as shown in FIG. 5, responsive to a determination that a substring of characters is to be obscured from the URL shown in FIG. 3, a substring of characters, in this case, the query string 310 and fragment ID 312 shown in FIG. 3, are simply not presented such that a blank space 314 appears in their place. Note that other substrings of characters, e.g., a person's name or a user name and/or password may be candidates for obscuration. Note further that equivalent obscuration may be afforded by overwriting the characters with symbols.

Figure 6:
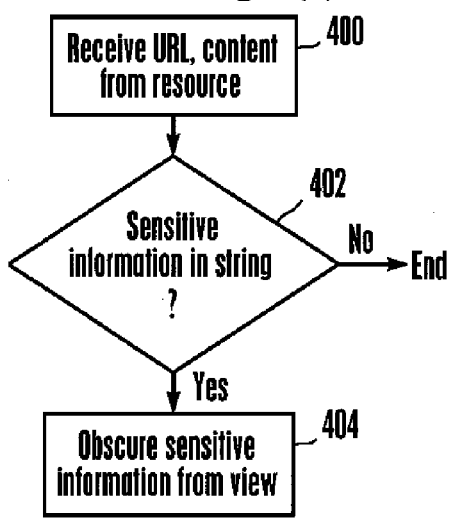
FIG. 6 is a flow chart of example logic employed by the receiver to obscure a substring of characters in a URL by employing rules for obscuration.
Figure 7:
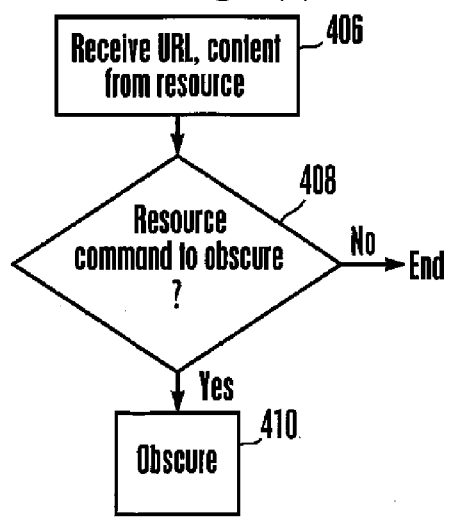
FIG. 7 is a flow chart of example logic employed by the receiver to obscure a substring of characters in a URL responsive to a command to obscure from the resource sourcing the content.

FIGS. 6 and 7 show example receiver logic that may be used in obscuring a substring of a URL, with FIG. 6 illustrating a rules-based system in which the receiver employs rules to determine whether to obscure a substring of a URL and FIG. 7 illustrating a command-based system in which a command from the serving resource instructs the receiver to obscure a substring of a URL.

Commencing at block 400 in FIG. 6, the URL is received, typically from a source of content, and at decision diamond 402 obscuration rules are applied to determine whether sensitive information is in the URL, i.e., to determine whether to obscure a substring of the URL. Rules may be applied in this regard to determine whether any substring in the URL should be obscured. Responsive to a determination that at least a substring of characters in the URL should be obscured, the logic flows to block 404 to obscure the substring according to obscuration methods such as those discussed above. Otherwise, the logic ends.

Without limitation, obscuration rules that may be employed at the receiver end to obscure a substring such as a query string include automatically obscuring any substring following an initial delimiter, such as a question mark, ampersand, etc. In other words, the receiver, responsive to detecting a predetermined delimiter in a URL, automatically obscures substrings following that delimiter. In addition or alternatively, the receiver automatically obscures any substring between an initial delimiter and a terminal delimiter.

Other obscuration rules may be employed as follows. Assume in some examples that the receiver must first authenticate itself to the server hosting the URL resource that is of a particular type that is capable of handling the content type, e.g., ad insertion, emergency alert messages, media format types, and security. Responsive to authentication of the receiver being an approved type, the server can tag the web page with information that tells the certified receiver that this page contains links with sensitive information. This may be done as part of a http response to a receiver's http get message. In the case of receivers certified as, by way of non-limiting example, being a Commercial Video Profile-2 as part of the digital living network architecture (DLNA) protocol, the receivers examine the web page for the existence of a predetermined http header tag indicating that a predetermined substring of the URL should be obscured. If the tag is present, the predetermined substring of the URL, e.g., the query string, is obscured by the receiver.

Commencing at block 406 in FIG. 7, the URL is received, typically from a source of content, and at decision diamond 408 it is determined based on a command from the resource sending the URL whether to obscure a substring of the URL. Note that the resource itself, in generating such a command, may apply obscuration rules such as those listed above as examples in determining whether to command the receiver to obscure a substring. Responsive to a determination that a command is received from the resource to obscure a substring of characters in the URL, the logic flows to block 408 to obscure the substring according to obscuration methods such as those discussed above. Otherwise, the logic ends.

Figure 8:
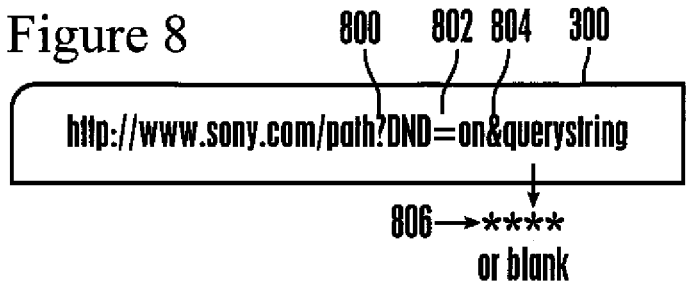
FIGS. 8-10 are example web page address bars showing obfuscation commands embedded in the address bar and for illustration showing the query string in the clear and below that the query string as it would appear onscreen in a compliant receiver pursuant to the obfuscation command.
Figure 9:
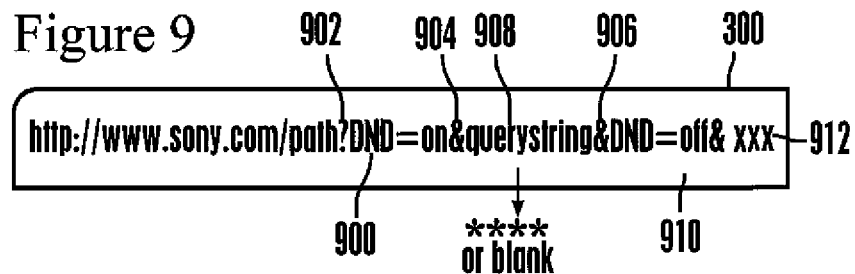
Figure 10:
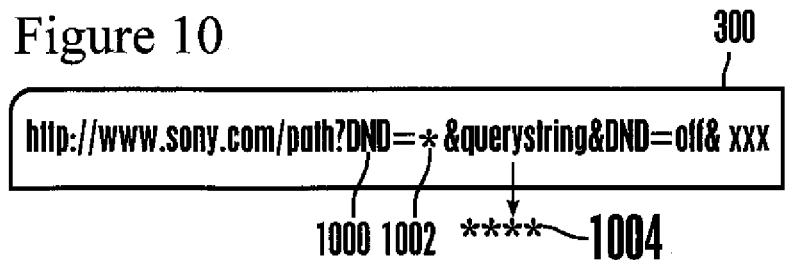

FIGS. 8-10 illustrate various examples in which an obscuration command is received in the URL itself. Note that while the address bar 300 shows the query string in the clear for illustration, the query string is not actually presented on the display of the receiver but rather is replaced by obscuration character or blank spaces as indicated in FIGS. 8-10.

In FIG. 8, following the question mark delimiter 800, an obscuration command such as a "do not display" or "DND" command appears, e.g., "DND=on" 802 indicating that obscuration is desired. In the example shown, only an initial obscuration command appears in the URL, indicating that the entire substring following an initial obscuration delimiter 804 such as an ampersand is to be obscured by, e.g., replacing the substring with a blank space or with a default character repeated multiple times, as indicated at 806 in FIG. 8.

FIG. 9 is similar to FIG. 8 except that in addition to an initial obscuration command 900 following a query initial delimiter 902 and an initial obscuration delimiter 904 following the initial obscuration command 900, a terminal obscuration delimiter 906 follows the substring 908 to be obscured and a terminal obscuration command 910 such as "DND=off" follows the terminal obscuration delimiter 906. This indicates that only the substring between the obscuration delimiters 904 and 906 is to be obscured, with any characters 912 following the terminal obscuration delimiter 906 to appear in the clear, unobscured.

FIG. 10 is similar to FIG. 9 except that following an initial obscuration command 1000, an obscuration character 1002 appears, indicating to the receiver the specific character that is to replace the substring between the obscuration delimiters, as indicated at 1004.

While the particular OBSCURING SENSITIVE PORTIONS OF UNIVERSAL RESOURCE LOCATOR is herein shown and described in detail, it is to be understood that the subject matter which is encompassed by the present invention is limited only by the claims.

What is claimed is:

1. An apparatus, comprising:
   at least one processor;
   at least one display configured for being controlled by the processor; and
   at least one computer readable storage medium accessible to the processor and bearing instructions which when executed by the processor cause the processor to execute logic comprising:
   receiving a uniform resource locator (URL) bearing a character string including at least one substring of characters for presentation of the character string on the display, the URL identifying a resource; and
   obscuring at least the substring of characters from presentation on the display, wherein the substring of characters is generated by a client-side query, a query string; wherein the obscured substring of characters does not include a path name and is distinct from a path name.

2. The apparatus of claim 1, wherein the substring of characters further includes a person's name.

3. The apparatus of claim 1, wherein the substring of characters further includes a user name and/or password.

4. The apparatus of claim 1, wherein the processor obscures the substring of characters based on at least one rule applied by the processor to the substring.

5. The apparatus of claim 1, wherein the processor obscures the substring of characters responsive to a command from the resource to obscure at least a portion of the string of characters.

6. The apparatus of claim 5, wherein the command is part of the URL.

7. The apparatus of claim 1, wherein the substring of characters is obscured by replacing the characters with symbols.

8. The apparatus of claim 1, wherein the substring of characters is obscured by overwriting the characters with symbols.

9. The apparatus of claim 1, wherein the substring of characters is obscured by replacing the characters with blank spaces.

10. Method comprising: determining whether a substring of characters generated by a client-side query in a uniform resource listing (URL) should be obscured from presentation on a display; and responsive to a determination based on a command from a device originating the URL that the substrings of characters should be obscured on the display, obscuring, using a computer processor, the substring of characters from view on the display and not obscuring portions of the URL that are not in the substring of characters wherein the obscured substring of characters does not include a path name and is distinct from a path name.

11. The method of claim 10, wherein portions of the URL that are not in the substring of characters are presented in an address bar of a browser or other application.

12. The method of claim 10, wherein the act of determining is executed by a receiver of the URL employing obscuration rules.

13. The method of claim 1, wherein the command is part of the URL.

14. The method of claim 10, wherein the substring of characters further includes a person's name.

15. The method of claim 10, wherein the substring of characters further includes a user name and/or password.

16. The method of claim 10, wherein the substring of characters is obscured by replacing the characters with blank spaces.

17. Device comprising: at least one processor; at least one display configured for being controlled by the processor; and
   at least one computer readable storage medium accessible to the processor and bearing instructions which when executed by the processor cause the processor to:
   obscure portions of a uniform resource locator (URL) in an address bar of a browser or other application automatically upon command from art originating device sourcing a resource associated with the URL, wherein the processor when executing the instructions obscures the portions responsive to a command from the originating device, wherein the command is part of the URL; wherein the obscured portions of a uniform resource locator (URL) is generated by a client-side query, does not include a path name and is distinct from a path name.

\* \* \* \* \*